United States Patent Office 3,090,270
Patented May 21, 1963

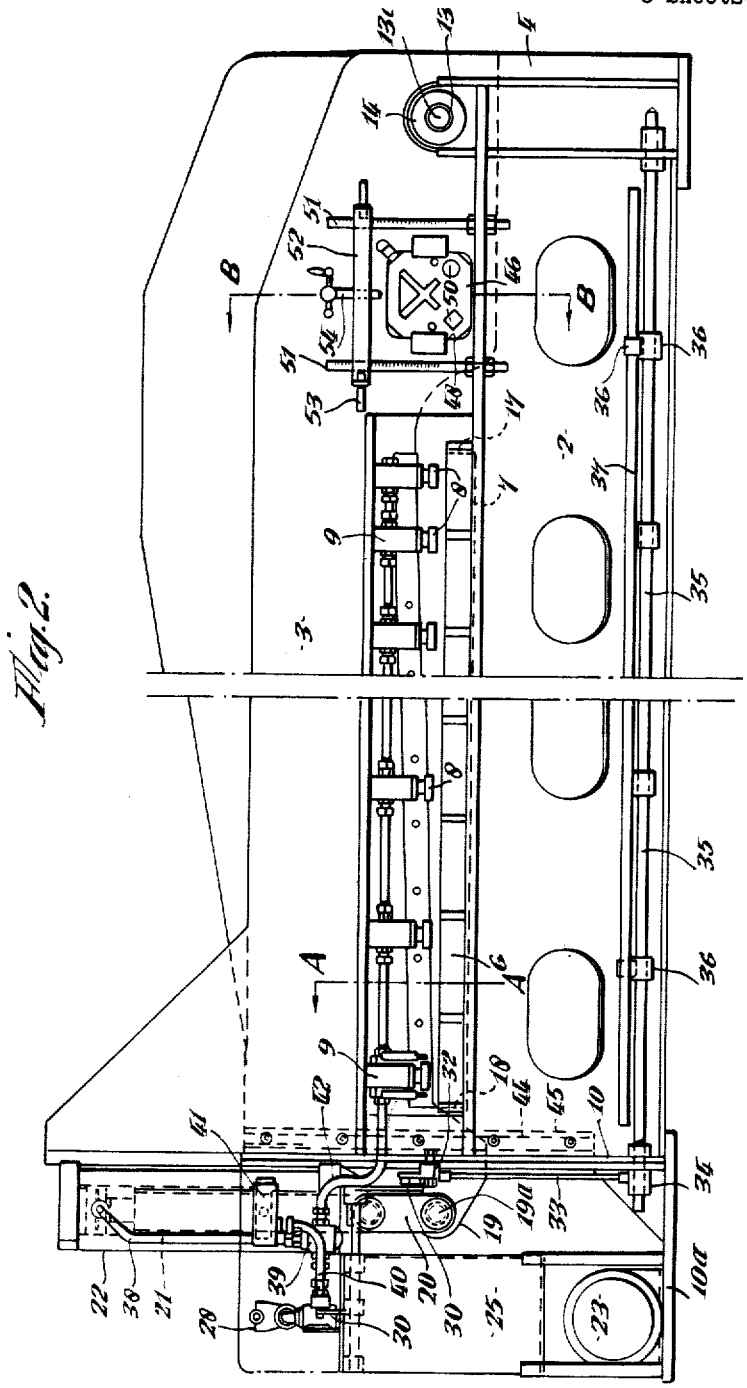

3,090,270
MACHINES FOR CUTTING OR SHEARING SHEETS OR PLATES
Charles Joseph Rhodes, Wakefield, and Harry Ridgway, Sandal, Wakefield, England; William Stanley Rhodes and Harry Ridgway, executors of said Charles Joseph Rhodes, deceased, assignors to Joseph Rhodes & Sons Limited, Wakefield, England, a British company
Filed Dec. 1, 1958, Ser. No. 777,383
Claims priority, application Great Britain Dec. 27, 1957
3 Claims. (Cl. 83—601)

This invention relates to machines for cutting or shearing sheets or plates (hereafter termed "plates") having a pivoted tool-carrying beam operated by hydraulic pressure or other power means.

Machines of the above type are known to have a pivoted arm or like member carrying a cutting tool positioned parallel with the axis of the pivot and thus the working stroke of a tool is in an arcuate path in relation to the fixed blade. In another well-known arrangement, both for manually-operated and power-operated machines, it is known to make the movable tool work in conjunction with a fixed cutting edge in the manner of the jaws of a crocodile and often known as "crocodile-type" shears. In the latter construction, particularly for large shearing machines, there is one main difficulty in regard to obtaining a true cutting angle throughout a shearing action through a substantial length of plate.

The main object of the present invention is to provide an improved shearing machine having a pivoted tool-carrying beam which can be constructed to cut plates of substantial length or width.

Accordingly there is provided a shearing machine of the type described, including a tool-carrying beam pivoted to a frame structure with the tool (in plan) lying longitudinally at a right angle to the beam axis, the tool blade on said tool beam having a downward rake away from the beam pivot and the nearest tool blade end spaced a predetermined distance from the pivot, and means for operating the beam at a point remote from the pivot, the construction being such that the tool blade rake and pivot position ensure a true cutting angle throughout the tool blade length and progressively increasing pressure commencing at its end furthest from the pivot, the tool blade cutting edge being straight.

The invention includes a shearing machine having a frame structure comprising a bed part, upper frame arm and an upright frame end all integral, the gap between said bed part and arm at their outer ends being bridged by a support, a beam mounted parallel with said frame arm and pivoted to said upright frame end, said beam carrying a tool blade having its straight cutting edge at a given downward inclination away from the pivot which has the nearest end of the tool blade spaced a substantial predetermined distance therefrom, and beam power-operating means at the outer end of the beam for providing at least the working stroke of the tool blade, whereby the tool blade has a progressively increasing shearing action starting from its end furthest from the pivot and a true angle of cut throughout its length.

The beam power-operating means may be hydraulic or mechanical.

Moreover, the improved shearing machine may incorporate auxiliary shearing means in or on the machine framework for cutting differently-shaped sections of metal with a movable blade carried by the aforesaid pivoted beam.

The invention will now be more particularly described with reference to the accompanying drawings in which:

FIG. 2 is a front view of a practical embodiment of the invention in the form of a hydraulically operated shearing machine;

Figure 1:
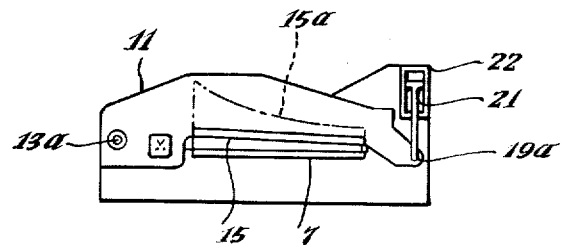
FIG. 1 is a diagrammatic rear view illustrating the basic feature of the invention in a simple form.
Figure 6:
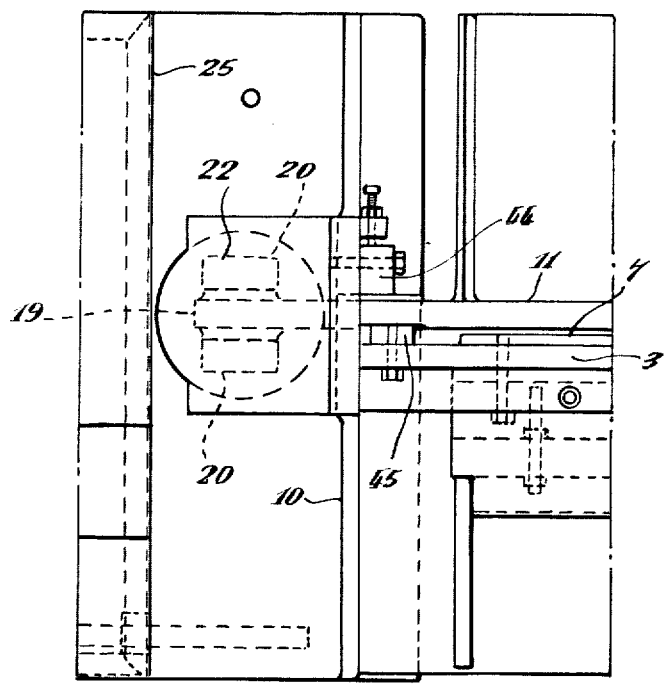
FIG. 6 is a detail plan view of the hydraulic cylinder and beam guide members.
Figure 3:
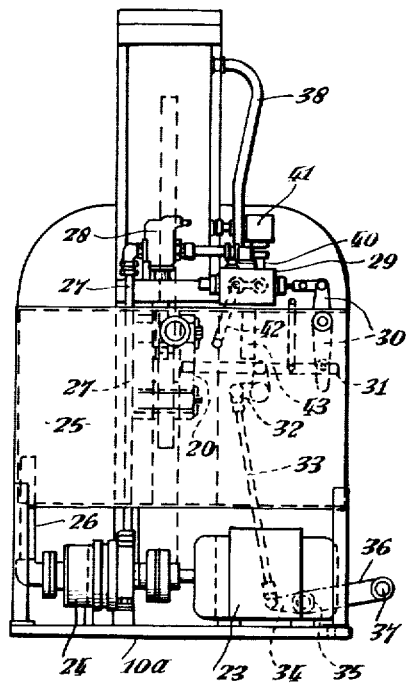
FIG. 3 is an end view of FIG. 1 from the operating end of the machine.
Figure 4:
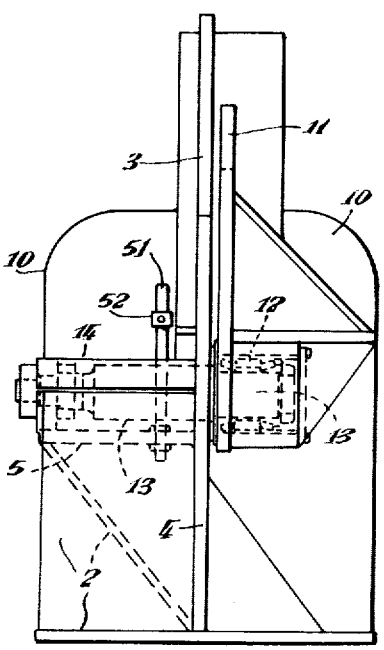
FIG. 4 is an end view of FIG. 1 from the pivot end of the machine.
Figure 5:
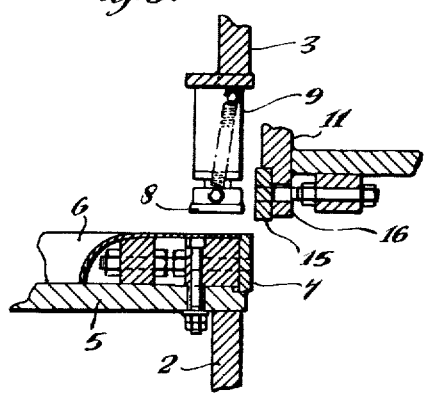
FIG. 5 is an enlarged section on line A—A of FIG. 2.
Figure 7:
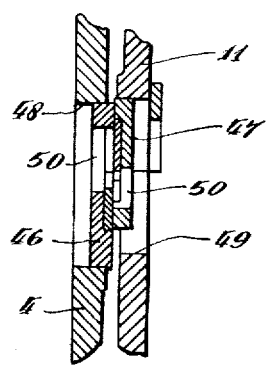
FIG. 7 is an enlarged section on line B—B of FIG. 2.

In the illustrated embodiment of this invention the shearing machine has a frame structure basically comprising, in fabricated form, it may be a casting, a bed part 2 with an upper frame arm 3 extending parallel thereover, the two parts being joined together at one end by an integral upright frame part 4. This bed part is furnished with a table 5 having a superposed work support 6 to which a cutting tool 7 is fixed along its rear edge in known manner and the upper frame arm carries spring returned holding-down members 8 which are hydraulically operated by piston-cylinder units 9. The other end of this frame structure, which hitherto has been open between the bed part and upper arm, is closed by a bridging upright support 10 which in effect reinforces the upper arm 3 against flexion during cutting operations. This support has a bed plate 10a which underlaps the bed part 2.

The other basic part of the machine comprises a tool-carrying beam 11 which at one end has a roller bearing 12 mounted on a pivot shaft 13 carried in a main pivot bearing 14 provided on the aforesaid integral frame end 4 forming part of the main structure. This beam has a cutting tool 15 fixed thereto along its lower edge with the cutting edge having a longitudinal reverse downward rake or inclination, i.e. in a direction away from the aforesaid pivot. It will be understood that this movable cutting tool 15 is of the usual simple construction having parallel edges with the lower edge 16 of the beam 11 running parallel therewith and thus also having a downward rake. The nearest end 17 of the tool 15 to the pivot shaft 13 is arranged to be remote from the pivotal axis 13a a predetermined distance which is calculated together with the downward rake of the tool so that the tool at its furthest end 18, in its raised position, allows sufficient clearance from the fixed tool 7 for the insertion of a plate of a thickness for which the machine is designed to cut, and that the tool will shear fully through such a plate and have a true substantially constant cutting angle throughout the cutting action which starts at the lowest end 18 of the tool 15.

In calculating the angle and position of the tool 15 it has been found that a convenient rake angle is three-eighths of an inch for each twelve inches of blade length and the distance between the blade end 17 and the pivot axis 13a be half the length of the blade. Moreover, it is considered that care must be taken regarding the relative positioning of the pivotal pressure axis 19a, cutting intersection of the blades 7 and 15 and the pivotal axis 13a, so that wherever the cutting intersection is in the length of the blades during a shearing operation, a straight line can approximately be drawn through the three points. With this arrangement, not only a true cutting angle is obtained, but progressively increasing pressure is achieved throughout the downstroke of the tool beam by virtue of simple leverage about the fulcrum 13a to which the load progressively advances, and as particularly illustrated at 15a in the diagrammatic view of FIG. 1.

The tool-carrying beam 11 is operated from its projecting end 19 by links 20 connected to a vertically-disposed hydraulic piston 21 mounted in a cylinder 22 carried by the aforesaid reinforcing end frame support 10 and this piston and cylinder is controlled by a hydraulic system which provides both the downward working stroke of the tool and also its reverse motion. As shown, an electric motor 23 drives a pump 24 drawing oil from the tank 25 through pipe 26 and forcing it through pipe 27 through pressure relief valve 28 to the control valve 29. The latter is operated by levers 30, rod 31, lever 32, link rod 33 and lever 34 fixed on the pivot shaft 35. Levers 36 fixed on the latter shaft carry a treadle member 37. The control valve 29 is connected by pipe 38 through valve 39 to the top of cylinder 22 and by pipe 40 through valve 41 to the lower part of the cylinder. This valve 41 provides exhaust restriction from the cylinder 22 and free flow thereinto. A pipe 42 is connected from valve 39 to the holding-down cylinders 9 and the valve 29 exhausts through pipe 43 to the tank 25. This valve 39 is used to ensure hydraulic pressure to cylinders 9 before operation of piston 21. Thus when the treadle is depressed oil under pressure is admitted to the cylinder 22 through pipe 38, immediately following admission through pipe 42 to the holding-down units, to give the tool beam 11 a down stroke and when the treadle is released the oil will pass through pipe 40 to reverse the beam stroke. The forward end of the tool-carrying beam works between guide means of which one member 44, adjustable for setting and wear, is provided on the back of said end reinforcing upright 10, and the other member 45 secured to the back of the bed 2 and arm 3.

As an additional feature, this shearing machine is made more universal by the provision of a so-called "cropping" unit which is built into the aforesaid integral end part 4 of the frame structure adjacent the beam pivot and above the table 5. This unit is of generally known form comprising a pair of blades 46, 47 of which blade 46 is fixed in an opening 48 in the frame structure 4 and the other blade 47 fixed in an opening 49 in the beam 11. Both blades have shaped openings 50 therein adapted to accept different cross-sectional shapes of bars or other metal members which may be, say of circular, rectangular, octagonal, angle, T, or other section. The bars or other members need simply be thrust through the two blades 46, 47 and as the beam 11 pivots the cropping blade 47 carried thereby will shear through the said bar or member. Here again, the frame structure may carry holding-down means for the bars or members. As shown a pair of upright pillars 51 are secured to the table 5 and have a slidable bridge 52 mounted thereon. The latter has a pair of displaceable handles 53 having their inner ends in engagement with a series of holes or notches in the pillars so that the bridge can be released and slid down into proximity with a member to be cut and then the handled screw 54 can be tightened down onto the member.

With the above arrangement, due to the leverage obtained, plates of greater thickness than the normal maximum can be cut by the tool so long as such plates are of less width or length than the overall length of the tool and by inserting them nearer to the pivotal axis. By this it is meant that should a tool be, say, eight feet in length and designed to cut plates of quarter-inch thickness, other plates progressively of greater thickness may be cut up to a given maximum by using a shorter length of the blade nearer the pivotal axis, i.e. say three-quarter inch plates may be cut towards the end 17 of the tool and, say, halfinch plates from about the middle of the tool.

In a modified arrangement the piston 21 and cylinder 22 may be used to produce merely the beam working stroke with other means to provide a tool return. On the other hand, the tool-carrying beam 11 can readily be operated by some other power means, such as a crank and crankshaft.

What we claim is:
1. A shearing machine comprising a frame having a horizontal table surface upon which the work to be cut is placed, a tool beam above said table surface pivotally connected at one end to said frame adjacent one side of said horizontal table surface, a movable cutter blade secured to said tool beam at right angles to the pivot axis thereof, a stationary cutter blade secured to said table surface substantially coplanar therewith at right angles to the tool beam pivot axis for shearing cooperation with said movable cutter blade, the cutting edge of said movable cutter blade having a predetermined downward inclination in a direction away from the beam pivot so that during a cutting operation the end of the movable cutter blade remote from the tool beam pivot axis will cooperate with said stationary blade before the end of said movable cutter blade which is adjacent said pivot axis, and means connected to said tool beam at the other end thereof remote from said pivot axis for pivoting said tool beam toward said table surface, said movable cutter blade being secured to said tool beam in such manner that the cutting intersection between said stationary cutter blade and said movable cutter blade lies always in a straight line which approximately can be drawn through the tool beam pivot axis and the point of connection of the means for pivoting said tool beam about its pivot axis toward said table surface, whereby said movable cutter blade has a substantially true angle of cut throughout its length and a progressively increasing shearing action starting from its end furthest from said pivot axis.

2. A shearing machine comprising a frame having a horizontal table surface upon which the work to be cut is placed, a tool beam above said table surface pivotally connected at one end to said frame adjacent one side of said horizontal table surface, a stationary cutter blade secured to said table surface substantially coplanar therewith at right angles to the tool beam pivot axis, hydraulic means secured to said frame adjacent the other end of said tool beam remote from said pivot axis and connected to said tool beam to pivot the same toward said table surface, and a movable cutter blade secured to said tool beam in such manner that the cutting intersection between said stationary cutter blade and said movable cutter blade lies always approximately in the plane which passes both through the pivot axis of said tool beam and through the pivot of connection of said hydraulic means to said tool beam, said movable tool blade being normal to the pivot axis of said tool beam for shearing cooperation with said stationary cutter blade, the cutting edge of said movable cutter blade having a predetermined downward inclination in a direction away from the beam pivot so that during a cutting operation the end of the movable cutter blade remote from the tool beam pivot axis will cooperate with said stationary blade before the end of said movable cutter blade which is adjacent said pivot axis, whereby said movable cutter blade has a substantially true angle of cut throughout its length and a progressively increasing shearing action starting from its end furthest from said pivot axis.

3. Apparatus as defined in claim 2 wherein the downward rake of the movable cutter blade is approximately three-eighths of an inch for each twelve inches of blade length, the edge of said movable cutter blade adjacent said tool beam pivot axis being spaced from said pivot axis a distance approximatly equeal to half the length of said movable cutter blade.

References Cited in the file of this patent
UNITED STATES PATENTS

| | | |
|---|---|---|
| 1,322,099 | Fegley | Nov. 18, 1919 |
| 1,454,285 | Hosch | May 8, 1923 |
| 1,729,076 | Laycock | Sept. 24, 1929 |
| 2,144,540 | Lindgren | Jan. 17, 1939 |

UNITED STATES PATENT OFFICE
CERTIFICATE OF CORRECTION

Patent No. 3,090,270 May 21, 1963

Charles Joseph Rhodes et al.

It is hereby certified that error appears in the above numbered patent requiring correction and that the said Letters Patent should read as corrected below.

In the heading to the printed specification, line 10, for "Dec. 27, 1957" read -- Dec. 23, 1957 --; column 4, line 64, for "equeal" read -- equal --.

Signed and sealed this 10th day of December 1963.

(SEAL)
Attest:

ERNEST W. SWIDER

Attesting Officer

EDWIN L. REYNOLDS

Acting Commissioner of Patents